March 27, 1962 | A. J. HUCK | Re. 25,146

JUG CLOSURE

Original Filed Feb. 29, 1960 | 2 Sheets-Sheet 1

INVENTOR:
Alfred J. Huck,
BY Bair, Freeman & Molinare
ATTORNEYS.

March 27, 1962 A. J. HUCK Re. 25,146

JUG CLOSURE

Original Filed Feb. 29, 1960 2 Sheets-Sheet 2

INVENTOR:
Alfred J. Huck,
BY Bair, Freeman & Molinare
ATTORNEYS.

United States Patent Office

Re. 25,146
Reissued Mar. 27, 1962

25,146
JUG CLOSURE

Alfred J. Huck, St. Louis, Mo., assignor to Knapp-Monarch Company, St. Louis, Mo., a corporation of Delaware Original No. 2,978,133, dated Apr. 4, 1961, Ser. No. 11,678, Feb. 29, 1960. Application for reissue May 29, 1961, Ser. No. 115,857
11 Claims. (Cl. 215—13)

Matter enclosed in heavy brackets [ ] appears in the original patent but forms no part of this reissue specification; matter printed in italics indicates the additions made by reissue.

This invention relates to jug closures and more particularly to automatic venting closures for insulated liquid containing jugs having discharge spouts or spigots.

One object of the invention is to provide a jug cap that is threaded onto a jug neck in the conventional manner, but is novel in that it has a hollow upwardly-opening section or socket that serves two purposes, first to contain a vent hole which is closed whenever a drinking cup is positioned in the socket, and second to provide in conjunction with the drinking cup a good additional thermal insulation for the jug in the area where it is very much needed, at the top where thermal losses occur more than from any other part of the jug.

Another object is to provide a two-piece cap representing a minimum number of simple-to-manufacture parts, that provides a spill-proof seal for the jug and provides the desired additional thermal insulation in the top area of the jug in addition to providing automatic venting.

Still another object is to provide an arrangement wherein the user, upon removing the cup to take a drink automatically exposes a vent hole in the cap to permit flow of air from the outside of the jug through the vent hole to the liquid contained in the jug so that free flow thereof occurs through either a spigot or spout into the drinking cup. Thus, it is merely necessary for the user to remove the drinking cup, and thereby flow of air through the vent hole of the jug cap is automatically had.

A further object is to provide a depressed plastic jug cap which constitutes a sealing member that need not be removed when the jug is being used to supply liquid therefrom, the opening of the vent hole eliminating the possibility of vacuum interfering with flow of liquid from the jug.

Still a further object is to provide the cap with internal ribs and the vent hole located, preferably but not necessarily, in one of the ribs so as to permit the escape of entrained air between the cup and the sealing cap when replacing the cup in the cap.

In insulated jugs thermal leakage occurs principally at the closure area of the jug and accordingly a maximum of insulating properties are highly desirable at this point to secure maximum efficiency of the insulated container.

An additional object of my invention is to provide a metal or plastic drinking cup in association with the customary jug cap and so placed as to provide an air space for this purpose between it and the jug cap proper. Because the cup in place produces a vacuum formed inside the jug when liquid is removed, a practical means of breaking this vacuum and permitting the ingress of air is needed to establish a flow of liquid from the jug. I accomplish this when the drinking cup is taken from its position in the cap and automatically opens a vent hole to provide proper venting for full liquid flow.

With these and other objects in view, my invention consists in the construction, arrangement and combination of the various parts of my jug closure, whereby the objects above contemplated are attained, as hereinafter more fully set forth, pointed out in my claims and illustrated in detail on the accompanying drawings, wherein:

Figure 1:
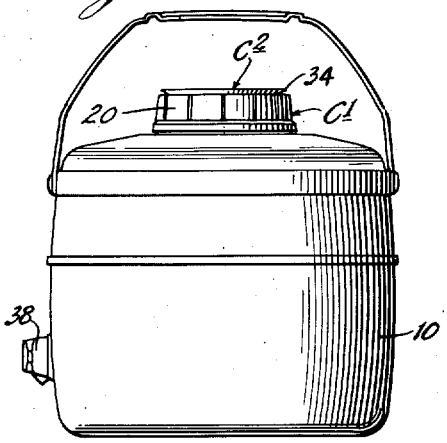
FIG. 1 is a side elevation of an insulated jug with my jug closure applied thereto.
Figure 2:
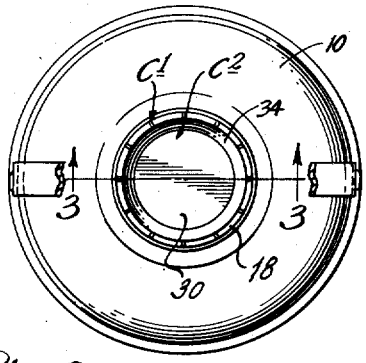
FIG. 2 is a plan view of FIG. 1 with the upper portion of the jug handle broken away.

On the accompanying drawings, I have used the reference numeral 10 to indicate the outer shroud of an insulated jug, 12 the inner lining thereof, and 13 the neck of the jug, which parts may be formed of sheet metal or the like. The neck 13 has a thread 14 formed therearound in the usual manner. Insulating material 15 is packed in the space between the shroud 10 and the liner 12 whereby an insulated jug is formed, a rubber or neoprene joint 16 being provided between the upper end of the liner 12 and the upper end of the neck 13 to minimize heat transmission. The upper end of the liner 12 is formed into an annular bead 17 for closure purposes as will hereinafter appear.

A closure or jug cap $C^1$ is provided which is preferably formed of insulating material, although it may be formed of metal if desired. As illustrated, it is molded in one piece to a shape that has an annular top wall 18, a depending flange 20 provided with screw threads 22 to coact with the threads 14 formed on the jug neck 13, a socket at the center having a bottom wall 24 and a cylindrical wall 26, and a slightly tapered or cone-shaped wall portion 28 to coact with the annular bead 17 for closure purposes when the cap $C^1$ is threaded tightly onto the neck 14 to the position illustrated in FIG. 3. The slight taper of the wall portion 28 may be only that required for mold draft such as ½ to 3°.

I provide a drinking cup $C^2$ also preferably molded as a single member of plastic material having a top wall 30, a depending cylindrical wall 32 and an upper flange 34 for convenience in grasping the cup $C^2$ to remove it from the cap $C^1$.

Figure 3:
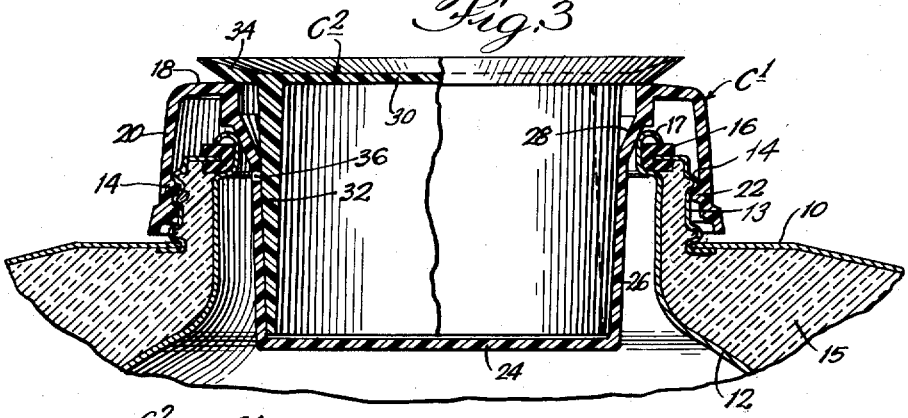
FIG. 3 is an enlarged vertical sectional view on the line 3—3 of FIG. 2 showing my novel jug closure with the drinking cup in position in the jug cap.
Figure 5:
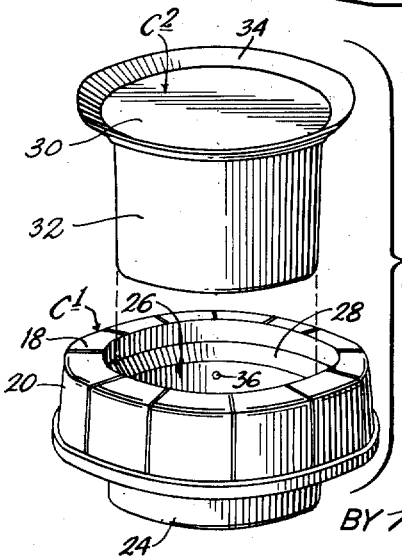
FIG. 5 is an exploded perspective view of the jug cap and the drinking cup per se.

The wall 32 is tapered in cross section as illustrated in FIG. 3 as usually required for "draw" from a molding die, and the wall 26 of the cap $C^1$ is similarly cone-shaped, the inner surface of the wall 26 and the outer surface of the wall 32 being at the same angle with respect to the axis of the cap and cup for a substantially air-tight contact when the cup is positioned in the cap with the flange 34 limiting the inward movement.

Figure 4:
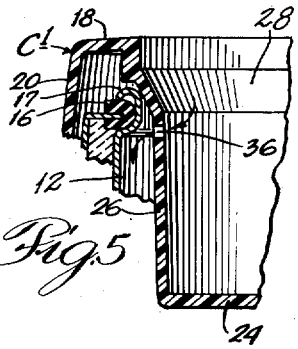
FIG. 4 is a similar sectional view of a portion of FIG. 3 showing the cup removed and the vent hole in the cap thereby automatically opened.
Figure 6:
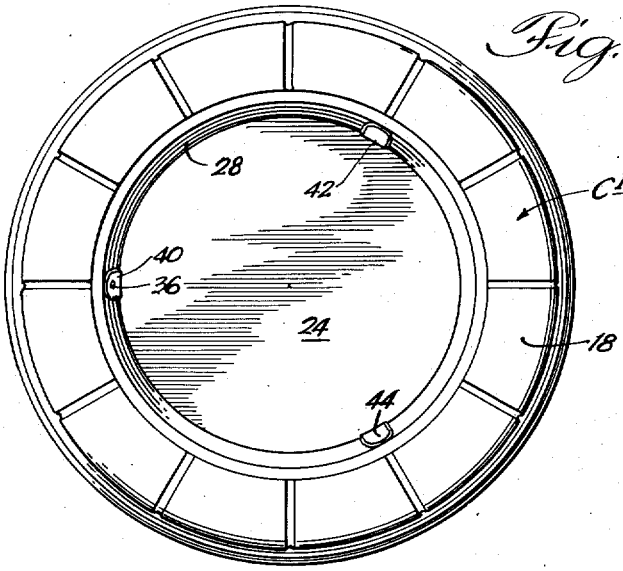
FIG. 6 is a plan view of the jug cap at the scale shown in FIG. 3 and shows a modified construction.

The cylindrical wall 26 of the cap $C^1$ is provided with a vent opening 36 which is automatically closed by the wall 32 in the position of the parts as shown in FIG. 3, and this is a very desirable feature of my invention in that it provides a vent which is automatically sealed when the cup $C^2$ is in the stored position relative to the cap $C^1$ and the jug is not in use. When it is desirable for the user to get a drink from the jug, however, he removes the cup $C^2$ which automatically opens the vent 36 as shown in FIG. 4 and the user may then fill the cup from a spigot 38 which is normally closed and provided with a push button for opening in the usual manner (or in place of the spigot 38 there may be a spout with a removable cork or cap associated therewith). In either event it is necessary to vent the upper portion of the jug to atmosphere in order to secure full flow of liquid from the spigot or spout and this is automatically accomplished by the vent 36 placed as indicated and thus automatically opened when the cup $C^2$ is removed, and again automatically closed when the cup $C^2$ is replaced. At the same time the cup provides an air space within the cap for further insulating efficiency at the top of the jug where most thermal leakage occurs.

Figure 7:
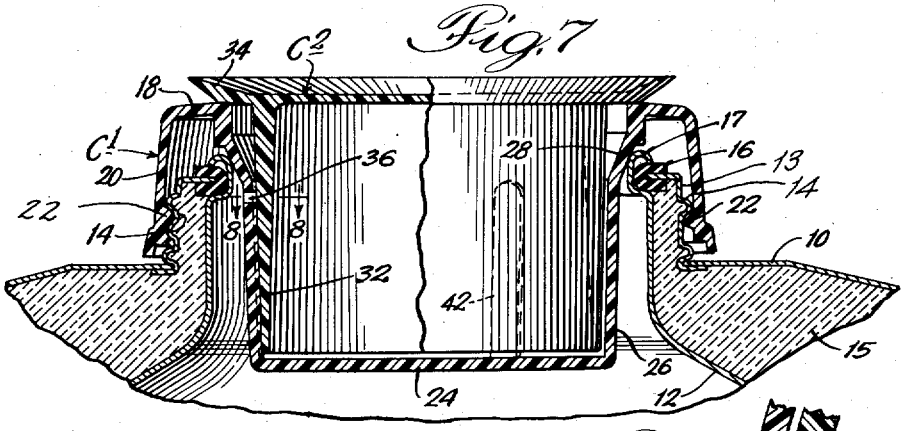
FIG. 7 is a vertical sectional view similar to FIG. 3 and showing the modified construction of FIG. 6.
Figure 9:
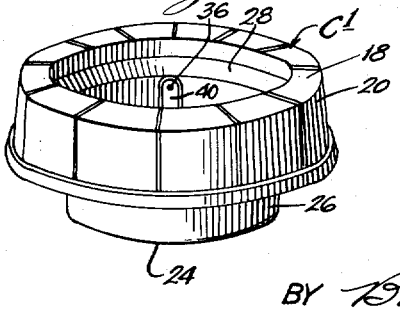
FIG. 9 is a perspective view of the jug cap shown in FIGS. 6 and 7.
Figure 8:
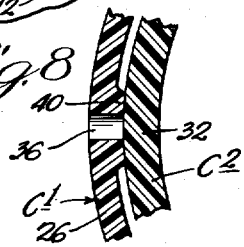
FIG. 8 is an enlarged vertical sectional view on the line 8—8 of FIG. 7.

Due to the air space within the cup $C^2$, air is trapped when the cup is placed therein in the cap $C^1$, but may be readily eliminated by the modified construction shown in FIGS. 6 to 9 inclusive. In these figures the same reference numerals have been applied and additionally the inner surface of the cylindrical portion 26 of the cap $C^1$ is provided with vertical ribs 40, 42 and 44 which hold the cylindrical wall 32 of the cup member $C^2$ spaced from the inner surface of the cylindrical wall 26 as shown in FIG. 8. The vent 36 is then preferably placed in one of the ribs such as 40 so as to be closed by the wall 32 when the cup is in stored position as shown in FIG. 7.

Some changes may be made in the construction and arrangement of the parts of my jug closure without departing from the real spirit and purpose of my invention, and it is my intention to cover by my claims any modified forms of structure or use of mechanical equivalents which may reasonably be included within their scope.

I claim as my invention:

1. In a jug closure, a jug cap having provisions for screwing the same on the neck of a jug, said cap having a depressed socket in its upper surface, and a cup normally received in said socket, the wall of said socket having a vent opening therethrough, said cup snugly fitting said wall and thereby normally closing said vent opening whereby removal of the cup automatically exposes said vent opening to atmosphere.

2. In a jug closure, a jug cap having provisions for screwing the same on the neck of a jug, said cap having a depressed socket in its upper surface, and a cup normally received in said socket, the wall of said socket having a vent opening therethrough, said socket having a slightly cone-shaped cylindrical wall, said cup having a cylindrical wall of complementary shape to snugly fit therein and thereby close said vent opening when therein, and said cup having an upper flange overlying the marginal edge of said cap when the cup is stored in the cap.

3. In a jug closure, a jug cap having provisions for screwing the same on the neck of a jug, said cap having a socket, and a cup normally received in said socket, the wall of said socket having a vent opening therethrough, said socket having a slightly cone-shaped cylindrical wall, and said cup having a cylindrical wall of complementary shape to snugly fit therein and thereby automatically close said vent opening when therein and automatically open said vent opening when removed therefrom for use.

4. In a jug closure, a jug cap having provisions for screwing the same on the neck of a jug, said cap having a depressed socket depending from the upper wall thereof, and a cup normally received in said socket, the wall of said socket having a vent opening therethrough, said cup normally closing said vent opening whereby removal of the cup exposes the vent opening to atmosphere, the inner surface of said socket having a plurality of ribs for spacing the outer surface of said cup from said inner surface to permit the escape of entrapped air when said cup is telescoped into said cap.

5. In a jug closure, a jug cap having provisions for screwing the same on the neck of a jug, said cap having a depressed socket depending from the upper wall thereof, and a cup normally received in said socket, the wall of said socket having a vent opening therethrough, said cup normally closing said vent opening whereby removal of the cup exposes the vent opening to atmosphere, the inner surface of said socket having a plurality of ribs for spacing the outer surface of said cup from said inner surface to permit the escape of entrapped air when said cup is telescoped into said cap, said vent opening being located in one of said ribs.

6. In a jug closure, a jug cap having provisions for screwing the same on the neck of a jug, said cap having a depressed socket in its upper surface, and a cup normally received in said socket, the wall of said socket having a vent opening therethrough, said socket having a cone-shaped cylindrical wall, said cup having a cylindrical wall of complementary shape to snugly fit therein, the inner surface of said socket having a plurality of ribs for spacing the outer surface of said cup from said inner surface to permit the escape of entrapped air when said cup is positioned in said cap, said vent opening being located in one of said ribs.

[7. In a jug closure, a jug cap having provisions for screwing the same on the neck of a jug, said cap having a depressed socket depending from the upper wall thereof, and a cup adapted to be received in said socket, the wall of said socket having a vent opening normally closed by said cup and opened by the removal of the cup therefrom.]

[8. In a jug closure, a jug cap having provisions for screwing the same on the neck of a jug, said cap having a socket, the wall of which has a vent opening therethrough, and a cup received in said socket and normally closing said vent opening whereby removal of the cup exposes the vent opening to atmosphere.]

*9. In a jug closure, a jug cap having provisions for securing the same on the neck of a jug, said cap having a vent opening therethrough, and a cup in telescoping and selectively readily separable storage relation with said jug cap, and said cup cooperating with said cap when said cup is normally in stored relation with said cap for normally closing said vent opening, and whereby selective removal of the cup from stored relation with said cap exposes the vent opening to atmosphere.*

*10. In a jug closure, a jug cap having provisions for securing the same on the neck of a jug, said cap having a vent opening therethrough, a cup of a size and shape related to the size and shape of the cap to permit of a telescoping and selectively readily separable storage association between portions of said cup and cap, and said cup when in said normal telescoping storage association with said cap operating to normally close said vent opening, whereby selective separation of said cup from storage association with said cap exposes the vent opening to atmosphere.*

*11. In a jug closure, a jug cap having provisions for securing the same on the neck of a jug, said cap having cap wall means with a vent opening therethrough, a cup having cup wall means adapted for readily separable but substantially air-tight contact with said cap wall means having the vent opening therethrough, and said cap and cup being arranged in a telescoping and selectively readily separable storage relationship with said cup normally closing said vent opening, whereby selective separation of said cup from said storage relation with cap exposes the vent opening to atmosphere.*

*12. In a jug closure, a jug cap having provisions for screwing the same on the neck of a jug, said cap having a depressed socket depending from the upper wall thereof, and a cup adapted to be selectively separably received*

*and stored in said socket, the wall of said socket having a vent opening normally closed by said cup and opened by the selective removal of the cup therefrom.*

*13. In a jug closure, a jug cap having provisions for screwing the same on the neck of a jug, said cap having a socket, the wall of which has a vent opening therethrough, and a cup selectively separably received and stored in said socket and normally closing said vent opening whereby selective removal of the cup exposes the vent opening to atmosphere.*

References Cited in the file of this patent or the original patent

UNITED STATES PATENTS 2,940,107 Sterling ---------- June 14, 1960